(12) United States Patent
Schenk et al.

(10) Patent No.: US 11,952,139 B2
(45) Date of Patent: Apr. 9, 2024

(54) VOLTAGE CONTROLLED AIRCRAFT ELECTRIC PROPULSION SYSTEM

(71) Applicant: Rolls-Royce Corporation, Indianapolis, IN (US)

(72) Inventors: Peter Schenk, Greenwood, IN (US); David Loder, Indianapolis, IN (US); David Trawick, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 272 days.

(21) Appl. No.: 17/321,146

(22) Filed: May 14, 2021

(65) Prior Publication Data

US 2022/0363402 A1 Nov. 17, 2022

(51) Int. Cl.
*B64D 31/06* (2006.01)
*B60L 50/60* (2019.01)
(Continued)

(52) U.S. Cl.
CPC .............. *B64D 31/06* (2013.01); *B60L 50/60* (2019.02); *B60L 58/19* (2019.02); *B64D 27/24* (2013.01);
(Continued)

(58) Field of Classification Search
CPC .... B64D 31/06; B64D 27/24; B64D 2221/00; B60L 50/60; B60L 58/19; B60L 2200/10;
(Continued)

(56) References Cited

U.S. PATENT DOCUMENTS 8,296,036 B2 * 10/2012 Matuszeski ........... H02J 7/1476
701/99
9,096,314 B2 8/2015 Brotherton-Ratcliffe et al.
(Continued)

FOREIGN PATENT DOCUMENTS

EP          3 462 563 B1    9/2020
WO    WO-2020074812 A1 *   4/2020 ............. B64D 27/24

OTHER PUBLICATIONS

Paschen's law, definition from Wikipedia, obtained from the Internet at: http://en.wikipedia.org/wiki/Paschen's_law, pp. 1-10.
(Continued)

*Primary Examiner* — Jason H Duger
(74) *Attorney, Agent, or Firm* — Shumaker & Sieffert, P.A.

(57) ABSTRACT

A voltage controlled aircraft electric propulsion system includes an electric propulsion system. The voltage controlled aircraft electric propulsion system may include electric propulsors providing thrust for the aircraft. In hybrid systems, a gas turbine engine may also be included. The electric propulsion system may include at least one electric generator power source, at least one propulsor motor load, and at least one stored energy power source, such as a battery. The propulsor motor load may be supplied power from a power supply bus. The voltage of the power supply bus may be adjusted according to an altitude of the aircraft while maintaining a substantially constant current flow to the propulsor motor load. Due to the adjustment to lower voltages at increased altitude, insulations levels may be lower.

18 Claims, 6 Drawing Sheets

(51) Int. Cl.
*B60L 58/19* (2019.01)
*B64D 27/24* (2006.01)
*H02J 1/00* (2006.01)

(52) U.S. Cl.
CPC ....... *B60L 2200/10* (2013.01); *B60L 2210/10* (2013.01); *B64D 2221/00* (2013.01); *H02J 1/00* (2013.01)

(58) Field of Classification Search
CPC . B60L 2210/10; H02J 1/00; H02J 7/34; H02J 7/0024; H02J 2310/44; B60W 2510/242; B60W 2510/244; B60W 2510/30; B60W 2510/305; B60W 2555/40; B60W 2710/244; B60W 2710/248; B60W 2710/30; B60W 2710/305; B60W 10/08; B60W 10/26; B60W 10/30; B60W 20/11; B60Y 2200/50; B60Y 2200/51; B60Y 2200/52; B60K 6/46; B60K 6/48; B60K 6/485; H02M 3/1582
See application file for complete search history.

(56) References Cited

U.S. PATENT DOCUMENTS

| | | | |
|---|---|---|---|
| 9,193,311 B2 | 11/2015 | Siegel et al. | |
| 10,099,794 B2* | 10/2018 | Bak | B64D 27/02 |
| 10,703,496 B2* | 7/2020 | Vondrell | B60L 50/16 |
| 10,992,201 B2 | 4/2021 | Calebrese et al. | |
| 2016/0105030 A1* | 4/2016 | Neuhaus | G06F 1/263 |
| | | | 700/298 |
| 2019/0152617 A1* | 5/2019 | Anton | B64D 31/00 |
| 2021/0147092 A1* | 5/2021 | Brown | B64D 31/06 |
| 2021/0347492 A1* | 11/2021 | Salanne | H02J 4/00 |
| 2021/0371116 A1* | 12/2021 | Cartwright | B60L 50/60 |
| 2022/0029431 A1* | 1/2022 | McLean | B60L 50/66 |

OTHER PUBLICATIONS

Battel, Steven, "High Voltage Engineering Techniques For Space Applications", NESC-Battel Engineering, Apr. 2012, pp. 1-239.

\* cited by examiner

VOLTAGE CONTROLLED AIRCRAFT ELECTRIC PROPULSION SYSTEM

TECHNICAL FIELD

This disclosure relates to aircraft electric propulsion systems and, more particular, to voltage controlled aircraft electric propulsion systems.

BACKGROUND

Aircraft may include one or more gas turbine engines and/or electric motors. Electric motors may be alternating current (AC) or direct current (DC) motors supplied electric power by the aircraft. Such electric motors provide a wide variety of functions, including, in some examples propulsion of the aircraft. Gas turbine engines may include a compressor, a combustor and a turbine. Typically, the compressor is an air compressor rotating on a shaft of the engine to provide air for the combustion cycle. The air is provided to the combustor along with fuel where combustion occurs to create a high pressure, high temperature flow, which is provided to the turbine. The turbine may provide mechanical torque to the shaft and may provide exhaust gas that creates thrust. The shaft may be used to rotate external devices, such as an electric generator or other devices used to produce electric power for use in the aircraft.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

A voltage controlled aircraft electric propulsion system may be operated to control the voltage on a power supply bus by energizing the power supply bus with a generator power source, a stored energy power source or a combination thereof. Power from the power supply bus may be supplied to an electric propulsor of an aircraft used to provide thrust to the aircraft. A controller circuitry may control a voltage magnitude on the power supply bus to a first predetermined voltage while the aircraft is at sea level or within a predetermined distance above sea level. An altitude of the aircraft may be monitored. The altitude is a measured dynamic value indicative of a distance of the aircraft above sea level. The controller circuitry may control a voltage magnitude on the power supply bus according to the altitude of the aircraft such that the voltage magnitude is decreased as the aircraft increases in altitude.

One interesting feature of the system is that decreases in bus voltage are dynamically controlled based on a lapse rate of the electric propulsors, which changes with increasing altitude. Synchronism of the lapse rate with the decreases in bus voltage may result in the current supplied to the electric propulsors remaining substantially constant. Since the current remains substantially constant as the bus voltage is decreased with increasing altitude, performance of the propulsors may be unaffected. Because the voltage may be reduced at higher altitudes, the level of insulation needed for power cables and other electrical equipment may be reduced, which provides significant benefits in terms of weight.

Figure 1:
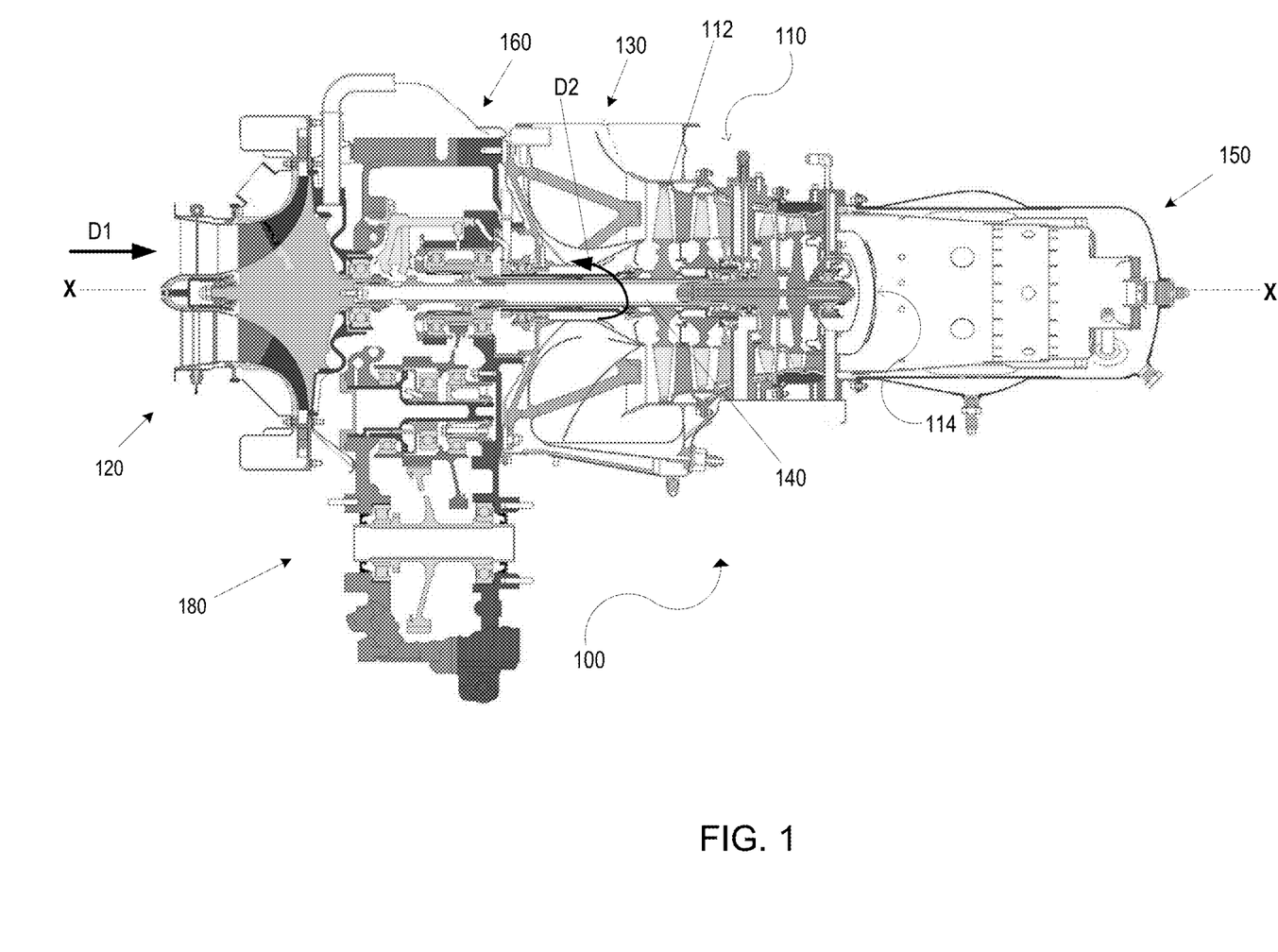
FIG. 1 is a cross-sectional view of a gas turbine engine.

FIG. 1 is a cross-sectional view of a gas turbine engine 100. In some examples, the gas turbine engine 100 may supply power to and/or provide propulsion of an aircraft. Examples of the aircraft may include a helicopter, an airplane, an unmanned air vehicle, a fixed wing vehicle, a variable wing vehicle, a rotary wing vehicle, an unmanned combat aerial vehicle, a tailless aircraft, a hover craft, a blimp, an airship, and any other airborne vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various embodiments. Though depicted as a two-spool engine having a centrifugal compressor and axial flow gas generator and power turbine stages, in some forms the gas turbine engine 100 may have one or multiple spools and/or may be any form of axial flow engine or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include an intake section 120, a compressor section 160, a combustion section 130, a turbine section 110, and an exhaust section 150. During operation of the gas turbine engine 100, fluid received from the intake section 120, such as air, travels along the direction D1 and may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

As noted above, the hot, high pressure fluid passes through the turbine section 110 during operation of the gas turbine engine 100. As the fluid flows through the turbine section 110, the fluid passes between adjacent blades 112 of the turbine 114 causing the turbine 114 to rotate. The rotating turbine 114 may turn a shaft 140 in a rotational direction D2, for example. The blades 112 may rotate around an axis of rotation, which may correspond to a centerline X of the turbine 114 in some examples. In some examples, the gas turbine engine 100 may include a power transfer 180 in the form of a transmission or gearbox. The power transfer 180 may extract energy from the engine output in the form or torque at an angular velocity, and transfer such energy to other components within an aircraft. In an example of a helicopter or airplane, the power transfer 180 may transfer energy extracted from the engine to one or more propulsors. As used herein, the term "propulsor" or "propulsors" is defined as a helicopter rotor, an airplane propeller, a ducted fan, or other mechanical device that is driven by a motor to provide propulsion.

In some examples, one or more of the propulsors may be driven by electric propulsor motors driven by AC or DC power. In these examples, the power transfer 180 may rotate an electric generator, such as a synchronous or asynchronous generator capable of generating AC or DC power. The electric generator may operate as a generator power source to supply power to the electric propulsor motor(s). In examples, the generator power source may supplementally include, or be other than an electrical generator, such as an energy storage power source, a fuel cell, a solar collector and the like, which generate electric power instead of, or in addition to the electrical generator. In examples, the electric propulsor motors(s) may receive power from energy storage power sources, such as batteries, that supplement or replace the electric generator. Thus, in some examples, the electrical generator and the gas turbine engine may be omitted, such as in the case of a fully electric aircraft. In still other examples, the electric generator may be driven by some other form of prime mover, such as a combustion engine.

Figure 2:
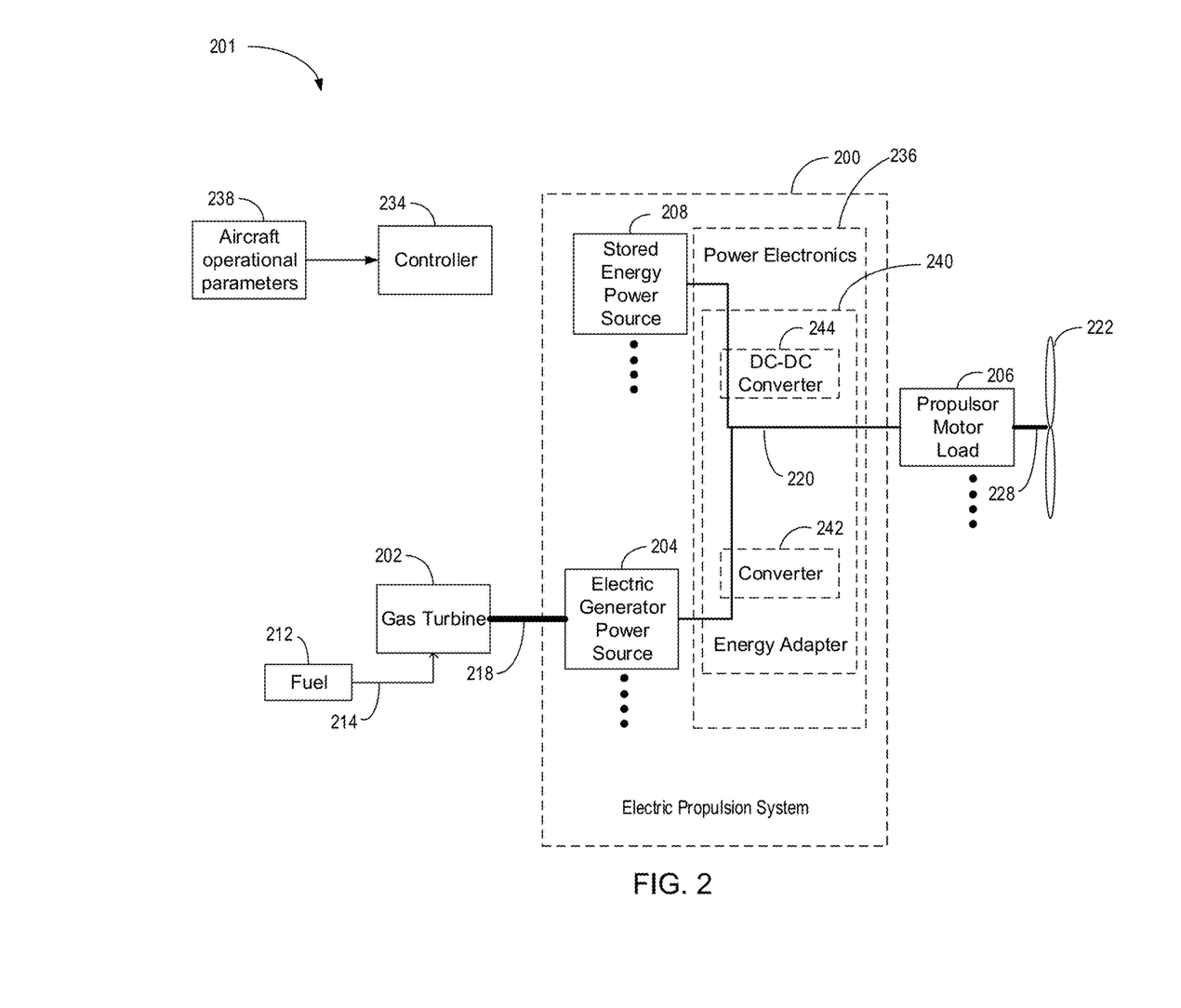
FIG. 2 is a block diagram example of a voltage controlled aircraft electric propulsion system.

FIG. 2 is a block diagram example of a voltage controlled aircraft electric propulsion system 201. The voltage controlled aircraft electric propulsion system 201 may include an electric propulsion system 200 operable with a gas turbine engine 202 as a hybrid propulsive system for an aircraft. The electric propulsion system 200 may include at least one electric generator power source 204, at least one propulsor motor load 206, and at least one stored energy power source 208. The electric propulsion system 200 may supply power to one or more propulsor motors as part of the propulsor motor load 206 with one or more electric generator power sources 204 and/or one or more stored energy power sources 208. Thus, it should be understood that the electrical configuration of electric generator power sources 204 and/or stored energy power sources 208, propulsor motors 206 and power supply busses 220 may be different in different designs, and is not limited to the example of FIG. 2 or the discussion herein of devices in plural or singular form. In addition, in examples, the gas turbine engine 202 and/or electric power generator power source 204 may be omitted, such as in an example of an all-electric aircraft where thrust is provided only by propulsor motor(s).

In the illustrated example of FIG. 2, the electric propulsion system 200 may be configured as a variable load supplied rotational energy by a prime mover in the form of the gas turbine engine 202. The gas turbine engine 202 may be supplied fuel by a fuel system 212 at a variable flow rate to vary the rotational torque output of the gas turbine engine 202. A fuel flow rate through a fuel line 214 to the gas turbine engine 202 may be variably controlled by the fuel system 212 based at least in part on a demand signal requesting a magnitude of rotational torque output from the gas turbine engine 202. The gas turbine engine 202 may include a power takeoff that spins a rotational shaft 218 mechanically coupled to the electric generator power source 204. Alternatively, or in addition, the prime mover may be a combustion motor, such as a diesel motor, or some other rotational device with controllable variable rotational torque output that drives the electric generator power source 204.

The generator power source 204 may be an asynchronous or synchronous machine capable of outputting electric power when rotated by the shaft 218. The electric power may be output as alternating current (AC) or direct current (DC) power. The electric power output from the generator power source 204 may be output to one or more electric power supply load busses 220. The power supply busses 220 may also be supplied electric power from the stored energy power sources 208. Loads may be electrically coupled with the power supply bus 220 and supplied the electric power output from the generator power source 204, the stored energy power source 208. A voltage of the electric power on the power supply bus 220 may be stepped up, stepped down, or converted, such as from AC to DC prior to being supplied to the loads. One of these loads may be the propulsor motor load 206.

The propulsor motor load 206 may be energized by the voltage present on the power supply bus 220 such that each propulsor motor 206 rotates a respective propulsor 222, such as an airplane propeller or a helicopter rotor, which can provide lift and/or thrust to the aircraft or other vehicle. The propulsor motor load 206 may include one or more induction or synchronous motors operable to rotate an output shaft 228 when energized with a variable rotational torque. The output shaft 228 may be mechanically coupled with the propulsor 222.

The system for the aircraft may also include a controller circuitry 234. The controller 234 may include circuitry configured to perform the functions described herein. The controller 234 may, for example, include a non-transitory memory with instructions stored therein that are executable by the controller 234. The controller 234 may include one or more processors executing logic based on the stored instructions.

During operation, the controller 234 may control and/or monitor the gas turbine engine 202, the propulsor motor load 206 and/or any other system or device present in the aircraft. In addition, the controller 234 may control the electric propulsion system 200 of the aircraft. Control of the electric propulsion system 200 may include the controller 234 dynamically controlling a voltage magnitude on the power supply bus 220. The controller 234 may control the voltage magnitude to a predetermined voltage using, for example, power electronics circuitry 236 included in the electric propulsion system 200.

The power electronics 236, may include one or more DC to DC converters which receive power such as direct current (DC) voltage and current from the stored energy power source 208. In examples where the electrical generator power source 204 provides alternating current (AC) power, the power electronics circuitry 236 may also include an inverter to convert the AC power to DC power, where DC power is supplied on a power supply bus 220. Where the electrical generator power source 204 supplies DC power, the inverter may be omitted and the electrical power supply bus 220 may receive similar voltage and current. The power electronics 236 may also include other devices, such as other inverters, DC to DC converters, AC to DC converters, and the like, which may be supplied power from the electrical power supply bus 220.

In the example of FIG. 2, an electric energy adapter 240 may be included in the power electronics 236. The energy adapter may be electrically coupled with the output of the electric generator power source 204 and the stored energy power source 208. The electric energy adapter 240 may include rectifiers, inverters, converters and/or other energy controllers. In FIG. 2, an example converter 242, which may convert a voltage level of AC or DC power received to a different voltage level of AC or DC power is illustrated. Alternatively, or in addition, a rectifier, which may rectify AC power received from the electric generator power source 204 to provide DC power to the power supply bus 220 may be illustrated. Alternatively, or in addition, an inverter, which may invert DC power received from the electric generator power source 204 to provide AC power to the power supply bus 220 may be illustrated. The electric generator power source 204, and/or electric energy adapter 240 may receive control communications from the controller 334 to adjust the output voltage magnitude of the electric generator power source 204 and/or, for example, the energy adapter 240.

In addition, the controller 234 may monitor operational parameters 238 of the aircraft. For example, the controller circuitry 234 may monitor the altitude of the aircraft above sea level, and control the voltage magnitude on the power supply bus 220 accordingly. Thus, for example, the controller 234 may decrease the voltage magnitude below the predetermined voltage as the aircraft increases in altitude, and increase the voltage magnitude on the power supply bus back toward the predetermined voltage as the aircraft decreases in altitude. The controller circuitry 234 may receive the operational parameters 238 from sensors in the aircraft, and/or from other systems in the aircraft such as an aircraft monitoring system and/or a gas turbine engine controller, such as a full authority digital control system (FADEC)

Power cables and devices in the system may be appropriately sized and insulated for anticipated current carrying capacity. To avoid relatively large operating currents, relatively high voltages (HV) may be used. In some examples, relatively high voltages may be greater than 6000 Volts DC. In other examples, relatively high voltage may be voltages greater than 3000 Volts DC. In still other examples, relatively high voltages (HV) may be greater than 1500 Volts DC. Accordingly, as used herein, the term "high voltage" or "HV" may be greater than 1500V, 3000V or 6000V DC. Partial discharge may be an issue in such high voltage systems, particularly at altitude where the atmosphere is relatively thin. Partial discharge may be characterized by accelerated dielectric breakdown of insulation resulting in premature insulation failure or undesirable changes in the dielectric properties under high voltage (HV) stress. Partial discharge may be exacerbated at high altitudes, such as at 40,000 feet above sea level. Table I shows an example altitude derating factor for current carrying items, such as cables and motors due to partial discharge issues.

TABLE 1

Altitude Derating Factor

| Altitude: | Dielectric (pu) | Current (pu) |
|---|---|---|
| >3,000 ft (1000 m) | 1.00 | 1.00 |
| 4,000 ft (1200 m) | 0.98 | 0.992 |
| 5,000 ft (1500 m) | 0.95 | 0.980 |
| 10,000 ft (3000 m) | 0.80 | 0.96 |
| 12,000 ft (3600 m) | 0.75 | 0.95 |
| 14,000 ft (4200 m) | 0.70 | 0.935 |

A possible solution to address partial discharge is to increase the amount of insulation of conductors and electrical devices as shown in Table 1, however, this adds undesirable weight to the aircraft. Another possible solution is to decrease the voltage of the electrical system and increase the conductor size, which also adds weight to the aircraft.

The thinning of the atmosphere at high altitude allows for less power to be provided to the propulsor motor load 206, due to the relatively lower rotational torque needed by the aircraft propulsor 222, such as a fan or propeller. The decrease in power due to lower torque demand of the propulsor motor load 206 at higher altitudes may be described as a lapse rate. Paschen's law is useful to illustrate the partial discharge problem. Ohms law of power (P)=current (I)×voltage (V) is a corollary. The atmospheric conditions of altitude and air density may also be important variables in estimating where partial discharge may be an issue.

The controller circuitry 234 may control the electric propulsion system 200 system to provide a decreasing voltage at constant current to match the lapse rate of electrical equipment in the aircraft. This allows for reduced partial discharge as the altitude increases without re-design of a family of electrical products intended for low altitude operation. For example, electric Vertical Take-Off and Landing (eVTOL) aircraft are likely to stay within 1000 feet above ground level at all times. eVTOL is particularly weight challenging due to the physics of hovering. Thus, in eVTOL applications, electrical system design is biased toward high voltage and low current to keep the cable weight and equipment weight manageable with reduced levels of electrical insulation. In another example, fixed wing aircraft may fly at high cruising altitudes, which may be designed with relatively low voltage and relatively high current. In high altitude flight, the opposite condition is present for the electrical system design since not as much peak power is needed as in eVTOL applications because there is no hovering. Instead, a consideration of the electric system design in high altitude aircraft is one of energy density as the flights will be longer in duration. With reduced peak power demand, a lower voltage at altitude is desirable to reduce partial discharge.

Using the electric propulsion system 200, a common family of electrical products may be deployed to serve two different aircraft designs, such as eVTOL aircraft with higher current and lower voltage, and high altitude fixed wing with lower current and higher voltage. A single fixed wing aircraft may typically require more power during takeoff and low altitude climb than during cruise resulting in high current demand and lower voltage during these times. eVTOL applications, such as hybrid aircraft vehicles, may have more power available from their air breathing power sources at lower altitude, resulting in lower current demand and higher voltages during these times. Thus, in both of these example designs, the use of reduced system voltages at altitude may be advantageously used, such as where reductions in system voltages do not occur before altitudes above eVTOL applications are reached.

Reducing the magnitude of the bus voltage of the power supply bus 220 at altitude may reduce electrical stress on the insulation system, particularly in the HV cables and electrical motors/generators. This effect can be taken advantage of in two ways:
1. Insulation thickness may be reduced, resulting in an appreciable weight savings in the aircraft.
2. Insulation thickness may be kept the same, and insulation lifetime may be increased dramatically.

It is desirable to operate power cables and equipment voltages below the partial discharge inception voltage (PDIV), since insulation lifetime may be subject to a step change in reduction in operational life above PDIV.

Figure 3:
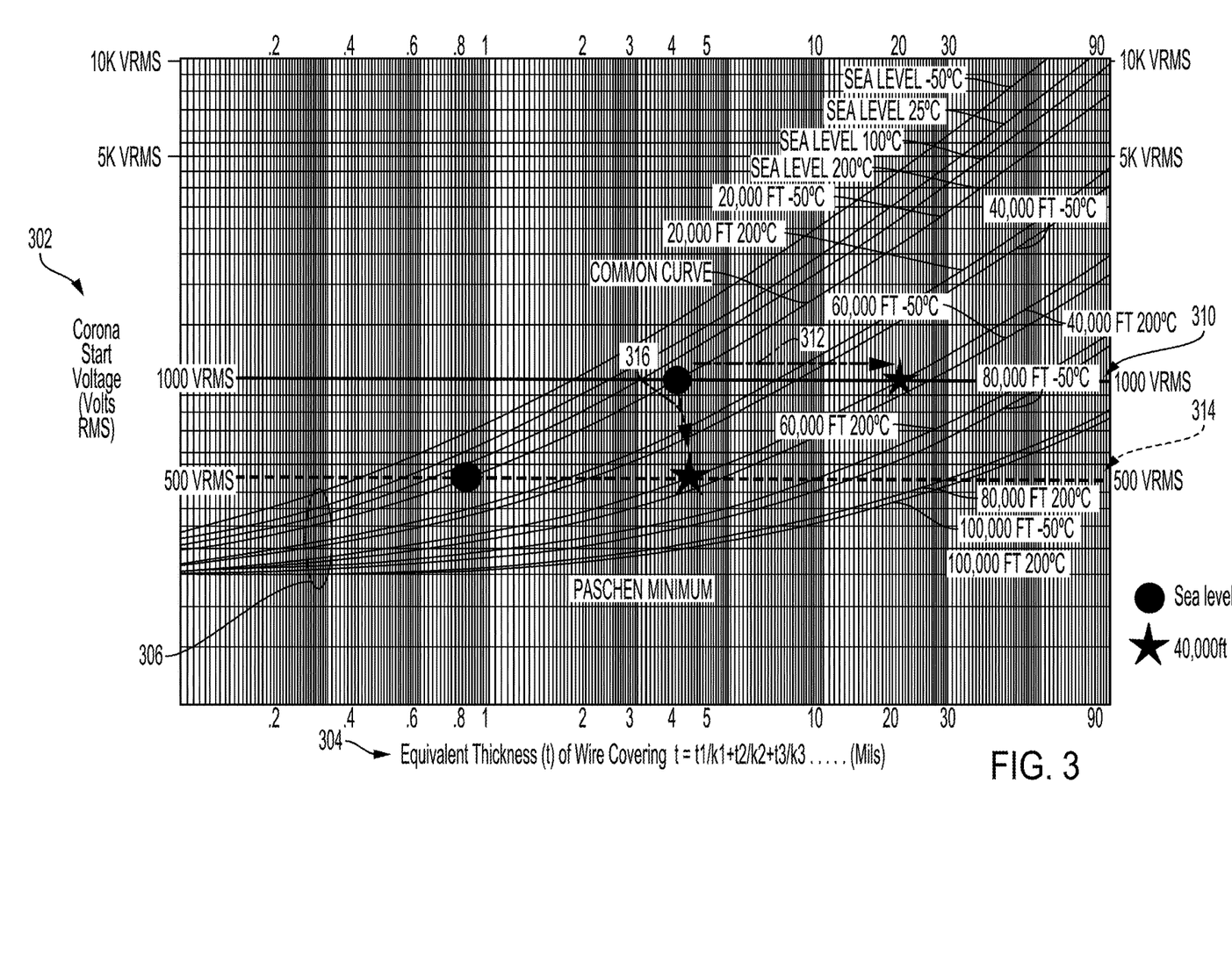
FIG. 3 is an example graph illustrating an impact of altitude and operational voltage on insulation thickness.

FIG. 3 is an example graph illustrating an impact of altitude and operational voltage on insulation thickness. The illustrated graph provides a corona start voltage 302 in volts RMS on the Y axis, which may be the PDIV, and an equivalent thickness of wire covering (insulation) in mils 304 on the X axis for each of a plurality of different altitudes and temperatures curves from sea level to 100,000 feet. Thus, FIG. 3 illustrates an example of how PDIV changes with respect to insulation thickness, altitude, and temperature for a HV power conductor. Assuming voltage stays constant at a predetermined voltage, such as at 1000 VRMS at 200 degrees Celsius, with changing altitude of the aircraft as illustrated by line 310, the insulation thickness increase required for a power system to operate at 40,000 ft (indicated in FIG. 3 with a star) is about 20 mils as opposed to sea level operation (indicated in FIG. 3 with a dot), which is about 4 mils. Accordingly, the thickness of cable insulation needed would be about 5.25 times higher, or 525% to accommodate the change in altitude to 40,000 feet, as illustrated by arrow 312. Reduction in the voltage at high altitude, such as to half of the nominal voltage, or 500 VRMS at 200 degrees Celsius as illustrated by line 314, results in the insulation thickness at 40,000 ft being 4.5 mils. Thus, according to the example of FIG. 3, if the voltage in the power cable is 500 VRMS at 40,000 ft, and 1000 VRMS at sea level, the increased in thickness of insulation of the power cable to accommodate operation at 40,000 ft is only a 25% increase from the insulation thickness at sea level, as illustrated by arrow 316.

Referring to FIGS. 2 and 3, in an example of the electric propulsor system 200, the controller circuitry 234 may maintain the power supply bus 220 at a predetermined voltage set point or altitude based voltage, such as at 1000 VRMS at sea level and for a predetermined altitude above sea level where lapse rate and PDIV are unlikely to occur. As the altitude of the aircraft increases during flight the controller circuitry 234 may correspondingly manage the voltage magnitude on the power supply bus 220 according to the altitude of the aircraft such that at 40,000 ft the power supply bus 220 altitude based voltage may be decreased to, for example, 500 VRMS. As illustrated by arrow 316 in FIG. 3, the resulting insulation requirements for cables and devices in the aircraft power system may be significantly reduced due to the reduction in voltage at high altitude when compared to the insulation requirements without a reduction in voltage, such as 1000 VRMS as illustrated by arrow 316.

Thus, the controller 234 may dynamically manage an altitude based voltage set point of the power supply bus 220 according to the altitude of the aircraft in order to maintain the bus voltage of the power supply bus 220 to manage current flow to the load, such as the propulsor motor load 206 below PDIV. In addition, the controller circuitry 234 may control the bus voltage according to the lapse rate of the propulsor motor load 206 to meet the power demand of the propulsor motor load 206. Accordingly, the bus voltage of the power supply bus 220 may be controlled by the controller circuitry 234 to keep a range of current flow below PDIV, and in accordance with the lapse rate of the propulsor motor load 206 during higher altitude flight.

Control of the bus voltage and therefore current flow of the power supply bus 220 according to the lapse rate of the load and PDIV may be accomplished by the controller circuitry 234 by using the electric generator power source 204 and/or the stored energy power source 208. For example, as the altitude of the aircraft increases or decreases and thus the power demand of, for example, the propulsor motor load 206 correspondingly decreases or increases, the controller circuitry 234 may respectively decrease or increase the voltage magnitude to maintain a current output from the generator power source 204 and the stored energy power source substantially constant as the altitude changes. In this situation, the current is "substantially constant" when the load demand is being satisfied without reaching PDIV.

In addition, or alternatively, the controller circuitry 234 may decrease or increase the voltage magnitude by adjusting the output voltage of the generator power source 204, the stored energy power source 208, or both, to decrease or increase the voltage magnitude according to a corresponding lapse rate decrease or increase in power of the load being supplied electric power from the power supply load bus 220. In an example, the controller circuitry 234 may decrease or increase the voltage magnitude by estimating a lapse rate of the load demand, such as the propulsor motor load 206, and decreasing or increasing the voltage magnitude according to the lapse rate of the load, such as the electric propulsor load 206. The lapse rate may be dynamically estimated by the controller circuitry 234 based on, for example, rate of change of ascent or descent of the aircraft, output thrust of the propulsors, predetermined tables or databases, an artificial intelligence model trained based on flight patterns of the aircraft, predetermined altitude values, or any other technique for predicting a rate at which power demand by the electric propulsor decreases with increasing altitude of the aircraft and increases with decreasing altitude of the aircraft.

For an electrical machine, such as a motor, rated to 1,000 VRMS, for example, the insulation thickness savings with lowering the voltage rating, such as to 500 VRMS, may result in an increase to the packing factor of about 3%, which may have a resulting weight savings of 3% in the motor. Further weight savings may be realized by allowing for smaller gauge conductors to be used in both machine windings and HV cables, due to heat dissipation being improved by reduced insulation thickness. In emergency modes, operation at full voltage may be required for some short amount of time. However, operation above PDIV is unlikely to cause an immediate failure, and if such emergency modes are infrequent, may have a lesser impact to the insulation system life.

Figure 4:
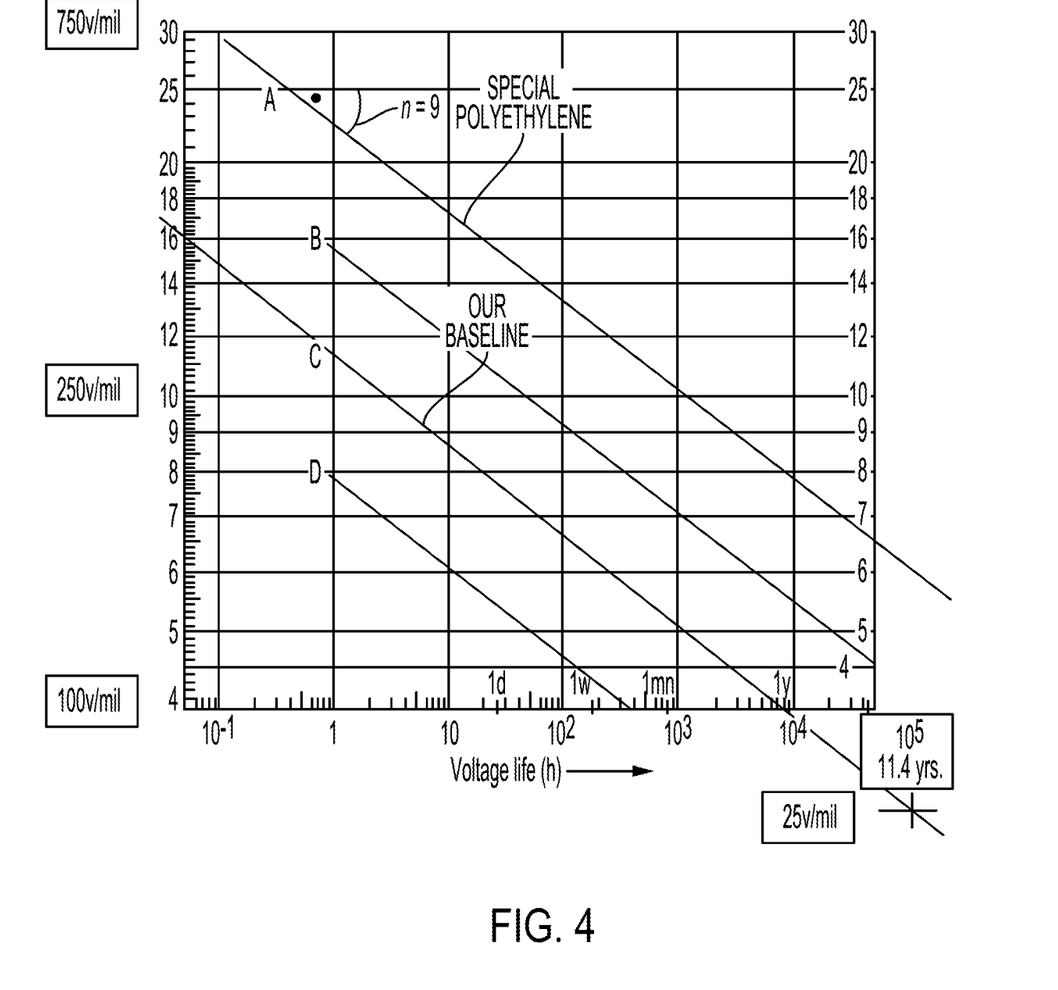
FIG. 4 is an example of Insulation lifetime vs. electrical stress for a power cable.

Alternately, FIG. 4 illustrates the impact on insulation lifetime assuming the insulation remains the same, and the voltage is reduced. FIG. 4 is an example of Insulation lifetime vs. electrical stress for a power cable. Insulation life related to electrical stress is typically modelled with an inverse power law, which may be generally to the power 9 for most insulation types. This relationship is captured by Equation 1, where L is the insulation lifetime, and E is the electric field within the insulation.

$$L \sim E^{-9} \qquad \text{EQ. 1}$$

Assuming the E-field and voltage have a linear relationship, reducing the voltage by half, for example, will lead to an insulation lifetime that is 512× the lifetime at full voltage. For a cable with $1.00 \times 10^4$ hrs life at 1,000 V, a voltage reduction of half would eliminate any concern of failure due to electrical stress (expected life of $5.12 \times 10^6$ hrs). It can be expected that the majority of the operation time of the aircraft power system will be at higher altitude cruise, with the corresponding reduced voltage. However, reducing the voltage on the power supply bus 220 may also increase the current in the cables to achieve the same amount of power. Therefore, the reduction in electrical degradation must also be balanced with an increase in the thermal degradation.

In order to reduce the voltage across the entire power distribution system of the aircraft, electrical components included in the electrical power system may be designed for compatibility with high voltage power system operation at low altitude, and lower voltage power system operation at higher altitude, and corresponding current and voltage control. These electrical components may include, for example, the electric machines (motors and generators), stored energy power systems, such as batteries, power electronics, and power distribution system.

Electric Machines

Electric machines supplied power from the electric propulsion system 200 may, for example, be induction motors, or switch reluctance motors (SRM) to enable operation of the motors in the aircraft at lower voltage and to reduce the field if a wound field design. For permanent magnet machine designs the electric propulsion system may have potential to reduce field weakening (leading to performance improvements). Alternatively or in addition, a machine design may be used that is capable of changing winding topology, such as delta-Y or shift windings from series to parallel. In addition or alternatively, electric machines may be used that include multi tap windings, capable of open circuiting part of the windings as unneeded due to reduced power.

Stored Energy Power Source

The stored energy power source 208 may be any hardware device or system capable of storing power and providing power to the power supply bus 220 as controlled by the controller circuitry 234. In an example, the store energy power source 208 may include batteries and associated electronics, such as a charger, inverter, and the like. In addition, or alternatively, the store energy power source 208 may include fuel cells, capacitors, and/or other energy storage devices.

Batteries may, for example, include a number of individual cells electrically connected to form a battery pack. The DC voltage output of the pack is a function of the state of charge and chemistry of each of the cells, with some reduction in power output performance when operated at a high current or after the cells have deteriorated due to age. The overall pack voltage is a product of the cell voltage and the number of cells in series. The available output current from the pack is the current from each cell times the number of cells in parallel. It is generally desirable to use all of the cells in the pack at the same rate to avoid imbalanced power output and/or uneven aging, which may lead to premature operational and/or performance issues with the pack. The pack may be electrically coupled with the power supply bus 220, such that the bus voltage of the power supply bus 220 may vary with the state of charge of the battery. In this scenario, the controller circuitry 234 may control the charging and discharging of the battery pack to control the magnitude of the bus voltage.

Alternatively, or in addition, a DC-DC converter 244 (or a DC-AC converter where the power supply bus 220 is AC) may be included in the energy adaptor 240. The DC-DC converter 244 may be used to isolate the batteries from the power supply bus 220 and keep the power supply bus 220 at a desired voltage. The DC to DC converter 244 may be any type of electric or electromechanical device capable of converting a DC voltage from one voltage level to another voltage level. Conversion between voltage levels may be buck or boost, and may be performed by, for example, high frequency switching using stored energy. The DC to DC converter 244 may be, for example, a uni-directional switched mode converter. The magnitude of the voltage of the electric power supplied to the DC to DC converter 244 may be changed to a greater or lesser magnitude and output by the DC to DC converter 244 on the power supply load bus 220. The controller circuitry 234 may control the magnitude of the bus voltage by bucking or boosting current to/from the battery using the DC-DC converter 244.

In order to enable a reduced operating voltage of the electric propulsion system 200 as the altitude of the aircraft increases the controller circuitry 234 may follow any of a number of different approaches of controlling the electric generator power source 204, the stored energy power source 208, and/or other loads in the aircraft to maintain the bus voltage below PDIV. For example, in the case of a hybrid aircraft, the controller circuitry 234 may increase (or cause to be increased) the thrust output of the gas turbine engine thereby creating a lower torque demand on the propulsor motor load 206, thereby decreasing the current flow at a given altitude based voltage. In another example, some of the propulsor motor load 206 and/or other loads being supplied power by the power supply bus 220 may be curtailed to reduce current flow to desirable levels at a given magnitude of altitude based voltage. In yet another example, energy adapters 240 in the power electronics 236 may be controlled by the controller circuitry 234 to reduce the bus voltage to a desired altitude based voltage. Thus, the controller circuitry 234 may switch, according to the altitude of the aircraft, an electric power feed to electrically connect additional load to the power supply load bus 220 to increase a total load on the load bus 220 with increasing altitude. In addition, the controller circuitry 234 may switch, according to the altitude of the aircraft, the electric power feed to electrically disconnect the additional load from the load bus to decrease a total load on the load bus with decreasing altitude. As such, the current of the load bus may be maintained substantially constant (+/−5%) due to the switching.

With regard to the stored energy power source 208, the source of power, such as batteries or a solar panel may be controlled by the controller circuitry 234 to reduce the voltage output to the desired altitude based voltage by shading the solar panel or reconfiguration of the electrical connections of the battery pack.

Referring again to FIG. 2, reconfiguration of the battery pack may be controlled in different operational scenarios. For example, in a first aircraft operational scenario, the controller 234 may control the battery pack to discharge during the takeoff and climb segments of aircraft flight sufficiently that the voltage output of the battery pack is controlled to remain at or below the determined altitude based voltage. In this example, since the voltage magnitude of the battery pack typically does not fluctuate by more than a predetermined percentage, such as 30%, and depends on the battery being properly depleted, the battery may only be recharged to the altitude based voltage as the aircraft changes altitude. Accordingly, depending on how quickly the aircraft decrease in altitude, the battery may not be fully charged to the altitude based voltage during descent and the landing phase of the aircraft.

In a second example operational scenario, the battery may be isolated from the power supply bus 220 by the controller circuitry 234 using the DC:DC converter 244, or some other isolating hardware such as an electrically operated switch, but otherwise be kept at a constant topology and voltage. For example, the voltage of the batteries may be at a low enough voltage to provide the altitude based voltage during a significant portion of the flight such as while the aircraft is cruising at a relatively constant altitude. Alternatively, or in addition, in this second operational scenario, just the batteries may include higher levels of insulation to avoid PIDV due to their voltage being above an altitude based voltage of a given altitude appropriate for supplying the power supply bus 220. Controlling the battery to a compromise voltage may provide some weight savings due to lowered required levels of insulation, however having the DC:DC converter 244 make gross changes at a high power level, for a battery output voltage much lower/higher than an altitude based voltage desired on the power supply bus may create efficiency challenges and possibly a weight challenge regarding the DC:DC converter 244 design.

In a third example operational scenario, the battery may include internal switches that enable the controller circuitry 234 to open circuit connections between individual cells in multiple locations if the cells are not needed at a certain altitude to achieve the desired altitude based voltage. For example, when a series stack of cells in the battery pack may be separated into different pieces, each piece only contributes a fraction of the total voltage and can safely endure a much higher altitude without PIDV. While disconnected, however, the cells may not be capable of being recharged, which may be acceptable where recharging batteries at altitude negatively impacts fuel efficiency due to the finite efficiency of flight weight gas turbines and the cost of carrying gas turbine fuel up to altitude in the first place.

In a fourth example operational scenario, the battery can have a variable topology, such as, for example a battery of a predetermined number of equal modules (or cells) capable of being electrically connected in different serial and parallel electrical configurations by the controller circuitry 234 according to the altitude of the aircraft. For example, for a variable topology of twelve modules, six series connected modules (6s) and two parallel connected modules (2p) may be configured on the ground/during takeoff and early climb of the aircraft. Following early climb, the modules may be disconnected and reconnected by the controller circuitry 234 as 4s3p or 3s4p during a safe point of the climb, and reversed during descent. Such additional hardware may add weight and complexity, such as due to the additional switches and precharge switches that may be used to reconfigure the modules dynamically with the controller circuitry 234. Careful design and monitoring by the controller circuitry 234 of a battery management system, for example, may enable the transition between configurations of the modules to be made in a way that connects modules that are close in voltage to reduce the amount of precharge circuitry.

Figure 5:
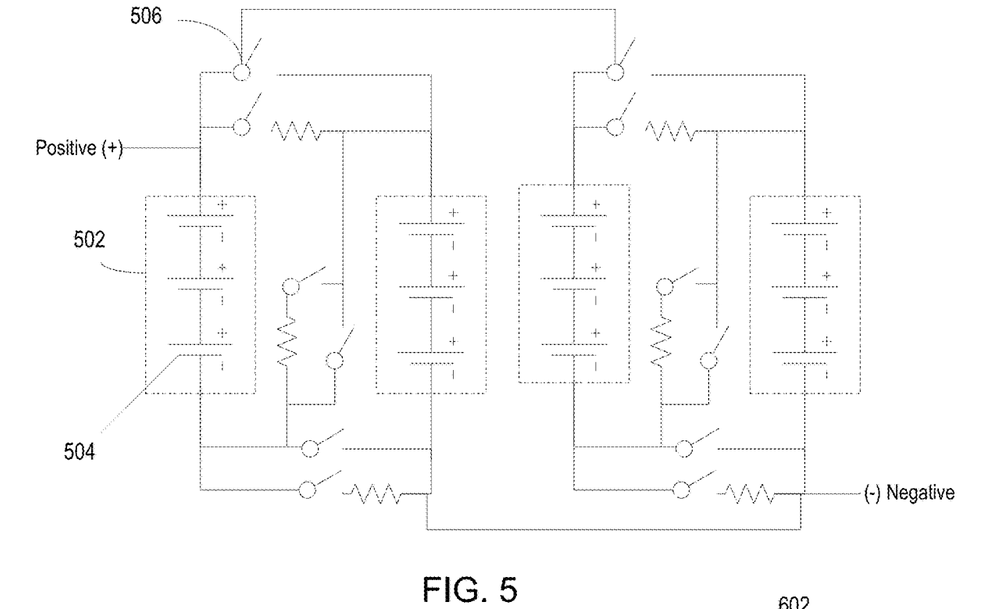
FIG. 5 is an example circuit configuration of a stored energy power source.
Figure 6:
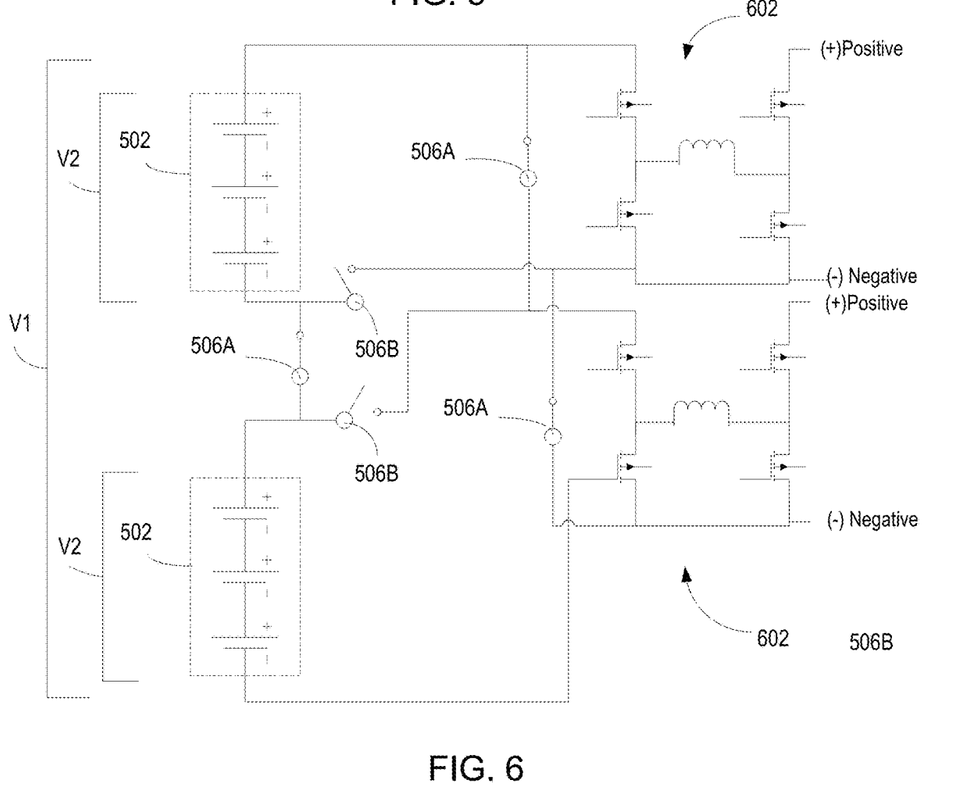
FIG. 6 is another example circuit configuration of a stored energy power source.

FIG. 5 is an example circuit configuration of a stored energy power source. In FIG. 5, the store energy power source includes four modules 502 of three cells 504 each, which are configurable by switches 506 in different series and parallel configurations by the controller circuitry 234. Referring to FIGS. 2 and 5, the DC:DC converters 244 may be used by the controller circuitry 234 to enable the HV battery to have a different voltage from the power supply bus 220 during the process of reducing the HV bus voltage due to increasing altitude of the aircraft. Each of the N (example 4) modules 502 could have its own DC:DC converter 244 to allow modules of different voltages to be put in parallel with fewer balancing issues. Alternatively, as illustrated FIG. 6 is another example circuit configuration of a stored energy power source. In the example of FIG. 6, two DC:DC converters 602 may be operated in parallel in an altitude based voltage mode (V2) or operated in series in a high voltage mode (V1) (as a 4 module interleaved converter for example). In the high voltage mode (V1), the switches 506A may be closed and switches 506B may be open. This switch configuration for the high voltage mode (V1) places the two DC:DC converters 602 in parallel on the two half-voltage battery modules 502 placed in series by switches 506A being closed and switches 506B being open during high voltage mode (V1). When the switches 506A are open and the switches 506B are closed, the DC-DC converters 602 may be separated to independently produce altitude based voltages (V2) when the aircraft is at altitude during the altitude based voltage mode. These two mode configurations enable the two DC-DC converters 602 to handle the high voltage mode (V1) but allows the two DC-DC converters 602 to divide the high current of the altitude based voltages mode (V2) between the two DC:DC converters 602 operating in parallel.

Power Distribution System

Power distribution units, or power distribution networks within an aircraft may include bus bars, which are maintained at a minimum spacing in air (clearance distance) depending on the voltage and the altitude of the aircraft. While clearance distances may be reduced to take advantage of reduced voltage at altitude, it may be advisable to maintain minimum spacing based on sea level operation at full voltage to allow for emergency operation at full voltage at any altitude. Contrary to solid insulation, air insulation may experience instantaneous failure when electrical stress rises above the breakdown point. Similarly to the HV cables, solid insulation used within power distribution units (e.g. insulating standoffs used for bus bars) may have considerations for reduced voltage stress, but increased thermal stress. However, due to the decrease in ambient air temperature at high altitudes, the peak temperature may not increase, but the insulation may experience temperatures closer to peak temperature for longer durations when voltage is decreased. Taken together, these considerations are not anticipated as having an appreciable impact on power distribution units.

Figure 7:
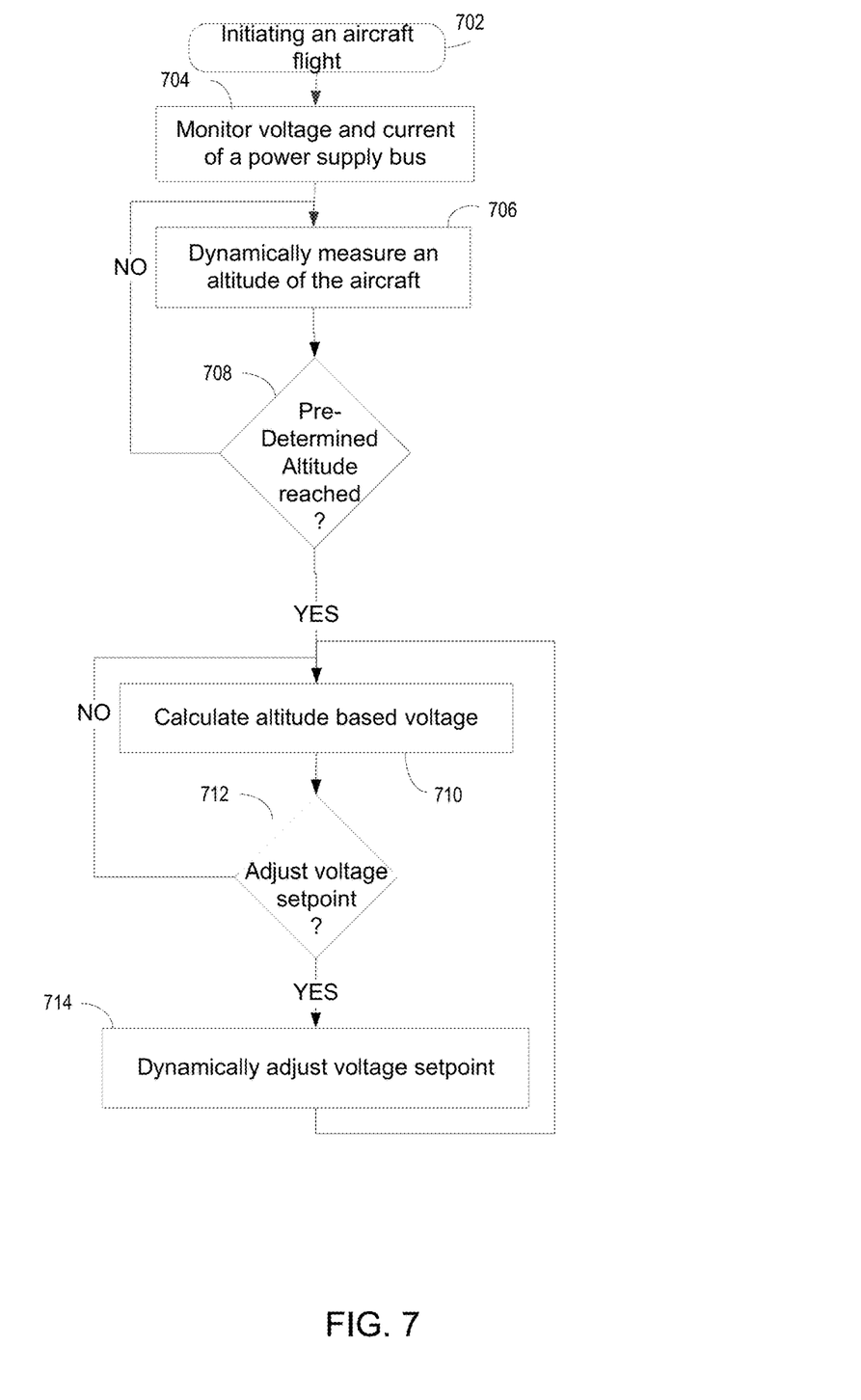
FIG. 7 is an operational flow diagram illustrating example operation of a voltage controlled aircraft electric propulsion system.

FIG. 7 is an operational flow diagram illustrating example operation of a voltage controlled aircraft electric propulsion system. Referring to FIGS. 2 and 7, the operation begins with initiating a flight with an aircraft where the aircraft takes off and is gaining altitude using the voltage controlled aircraft electric propulsion system. (702) The controller circuitry 234 may monitor a voltage and a current of a power supply load bus supplying power to a load, which includes at least one electric propulsor configured to provide thrust for the aircraft. (704) The controller circuitry 234 may dynamically measuring an altitude of the aircraft (706) until a predetermine altitude is reached. (708) For example, until the predetermined altitude is reached, the controller circuitry 234 may maintain a voltage set point of the voltage of the load bus at a maximum voltage while the aircraft is at or below the predetermined altitude. In this example, adjustment of the voltage set point of the voltage of the load bus according to changes in the dynamically changing altitude of the aircraft may occur only when the aircraft is above the predetermined altitude When the altitude of the aircraft reaches the predetermined altitude, the controller circuitry may calculate an altitude based voltage as a set point for the power supply bus 220. (710) The altitude based voltage may be determined based on a lapse rate of the electric propulsor, and the PDIV of cables and other electric devices being supplied power from the power supply load bus 220.

The controller circuitry may determine if the monitored bus voltage of the power supply bus 220 is different from the calculated altitude based voltage (712) and continue calculating the altitude based voltage when no adjustment of the bus voltage is warranted. When adjustment of the bus voltage is warranted, the controller circuitry 234 may dynamically adjust, a voltage set point of the voltage of the load bus. (714) For example, the controller circuitry may calculate a lapse rate of the electric propulsor such that as the altitude of the aircraft increases the voltage set point of the load bus is decreased according to the lapse rate of the electric propulsor. In another example, where the load on the load bus also includes additional power load of the aircraft supplied by the load bus, the controller circuitry may maintain the flow of the current on the load bus substantially constant as the altitude of the aircraft changes by calculating a lapse rate of the electric propulsor and a lapse rate of the additional power load, and as the altitude of the aircraft increases, decrease the voltage set point according to the lapse rate of the electric propulsor and the additional load.

The lapse rate of the electric propulsor may be determined based on thrust output. For example, the controller circuitry 234 may monitor an output thrust of the electric propulsor, and dynamically adjust the voltage set point of the voltage of the load bus according to changes in the dynamically changing altitude of the aircraft by dynamically adjusting a weighting applied to the voltage set point according to the output thrust of the electric propulsor. In another example, a thrust demand output for thrust of the electric propulsor may be monitored by the controller circuitry to determine an estimated lapse rate. In this example, the voltage set point of the voltage of the load bus may be dynamically adjusted by the controller circuitry 234 according to changes in the dynamically changing altitude of the aircraft by dynamically adjusting a weighting applied to the voltage set point according to the thrust demand output. It should be noted that any engine source may have a relative loss of power output at altitude, which may also be a factor.

Based on the set point adjustment, voltage supplied by at least one of the electric generator power source 204 or the stored energy power source 206, or the combination may be controlled by the controller circuitry 234 according to the set point adjustment. The controller circuitry 234 may then return to calculation of the altitude based voltage. (710) By adjusting the voltage set point on the power supply bus 220, a flow of the current on the power supply bus may be maintained substantially constant as the altitude of the aircraft changes. As used is this context, the term "substantially" means the current remains within +/−5%. Adjustment of the power supply bus to decrease the voltage set point of the load bus may occur as the altitude of the aircraft increases, and the voltage set point of the load bus may increase as the altitude of the aircraft decreases.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

In some examples, each unit, subunit, and/or module of the system may include a logical component. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method of operating an aircraft electric propulsion system comprising:
  energizing a power supply bus with a generator power source, a stored energy power source or a combination thereof;
  supplying power from the power supply bus to an electric propulsor of an aircraft;
  controlling, with a controller circuitry, a voltage magnitude on the power supply bus to a first predetermined voltage;
  monitoring an altitude of the aircraft, the altitude being a measured dynamic value indicative of a distance of the aircraft above sea level;
  controlling, with the controller circuitry, a voltage magnitude on the power supply bus according to the altitude of the aircraft; and
  decreasing the voltage magnitude as the aircraft increases in altitude.

A second aspect relates to the method of aspect 1, wherein decreasing the voltage magnitude further comprises controlling, with the controller circuitry, the decrease of the voltage magnitude to maintain a current output from the generator power source and the stored energy power source substantially constant as the altitude changes.

A third aspect relates to the method of aspect 1 or aspect 2, wherein decreasing the voltage magnitude further comprises adjusting, with the controller circuitry, an output voltage of the generator power source, the stored energy power source, or both, to decrease the voltage magnitude according to a lapse rate decrease in power of a power supply being supplied electric power from the power supply bus.

A fourth aspect relates to the method of any preceding aspect, wherein decreasing the voltage magnitude further comprises estimating, by the controller circuitry, a lapse rate of the electric propulsor and decreasing the voltage magnitude according to the lapse rate of the electric propulsor, the lapse rate being a rate at which power demand by the electric propulsor decreases with increasing altitude.

A fifth aspect relates to the method of any preceding aspect, further comprising increasing the voltage magnitude of the power supply bus, with the controller circuitry, as the altitude of the aircraft decreases to maintain substantially constant current on the power supply bus.

A sixth aspect relates to the method of any preceding aspect, wherein the stored energy power source comprises a battery pack comprising a plurality of battery cells, and wherein decreasing the voltage magnitude further comprises switching the battery cells between a parallel and a series configuration according the altitude of the aircraft.

A seventh aspect relates to the method of any preceding aspect, wherein the stored energy power source comprises a DC-DC converter, and wherein decreasing the voltage magnitude further comprises controlling an output voltage of the DC-DC converter according the altitude of the aircraft.

An eighth aspect relates to a method of operating an aircraft electric propulsion system comprising:
  monitoring, with a controller circuitry, a voltage and a current of a power supply bus supplying power to a load, the load comprising an electric propulsor configured to provide thrust for an aircraft;
  dynamically measuring an altitude of the aircraft;
  dynamically adjusting, with the controller circuitry, a voltage set point of the voltage of the power supply bus according to changes in the dynamically changing altitude of the aircraft;
  maintaining, with the controller circuitry, a flow of the current on the power supply bus substantially constant as the altitude of the aircraft changes, by adjustment of the voltage set point;
  decreasing, with the controller circuitry, the voltage set point of the power supply bus as the altitude of the aircraft increases; and
  increasing, with the controller circuitry, the voltage set point of the power supply bus as the altitude of the aircraft decreases.

A ninth aspect relates to the method of aspect eight, further comprising, switching, with the controller circuitry, according to the altitude of the aircraft, an electric power feed to electrically connect additional load to the power supply bus to increase a total load on the power supply bus with increasing altitude; and switching, with the controller circuitry, according to the altitude of the aircraft, the electric power feed to electrically disconnect the additional load from the power supply bus to decrease a total load on the power supply bus with decreasing altitude.

A tenth aspect relates to the method of aspect nine, further comprising maintaining, with the controller circuitry, the current of the power supply bus substantially constant by the switching.

An eleventh aspect relates to the method of any preceding aspect, further comprising calculating, with the controller circuitry, a lapse rate of the electric propulsor, and wherein decreasing, with the controller circuitry, the voltage set point of the power supply bus as the altitude of the aircraft increases according comprises decreasing the voltage set point according to the lapse rate of the electric propulsor.

A twelfth aspect relates to the method of any preceding aspect, wherein the load further comprises additional power load of the aircraft supplied by the power supply bus, and wherein maintaining, with the controller circuitry, the flow of the current on the power supply bus substantially constant as the altitude of the aircraft changes further comprises calculating, with the controller circuitry, a lapse rate of the electric propulsor and a lapse rate of the additional power load, and wherein decreasing, with the controller circuitry, the voltage set point of the power supply bus as the altitude of the aircraft increases comprises decreasing the voltage set point according to the lapse rate of the electric propulsor and the additional power load.

A thirteenth aspect relates to the method of any preceding aspect, further comprising maintaining the voltage set point of the voltage of the power supply bus at a maximum voltage while the aircraft is at or below a predetermined altitude, and adjusting, with the controller circuitry, a voltage set point of the voltage of the power supply bus according to changes in the dynamically changing altitude of the aircraft only when the aircraft is above the predetermined altitude.

A fourteenth aspect relates to the method of any preceding aspect, further comprising monitoring, with the controller circuitry, an output thrust of the electric propulsor; and wherein dynamically adjusting, with the controller circuitry, the voltage set point of the voltage of the power supply bus according to changes in the dynamically changing altitude of the aircraft comprises dynamically adjusting a weighting applied to the voltage set point according to the output thrust of the electric propulsor.

A fifteenth aspect relates to the method of any preceding aspect, further comprising monitoring, with the controller circuitry, a thrust demand output for thrust of the electric propulsor; and wherein dynamically adjusting, with the controller circuitry, the voltage set point of the voltage of the power supply bus according to changes in the dynamically changing altitude of the aircraft comprises dynamically adjusting a weighting applied to the voltage set point according to the thrust demand output.

A sixteenth aspect relates to a non-transitory computer readable medium storing instructions executable by a processor circuitry, the computer readable medium comprising:
instructions executable by the processor circuitry to control energization of a power supply bus with a generator power source, a stored energy power source or a combination thereof;
instructions executable by the processor circuitry to control a voltage magnitude on the power supply bus to a first predetermined voltage, the power supply bus supplying power from the power supply bus to an electric propulsor of an aircraft;
instructions executable by the processor circuitry to monitor an altitude of the aircraft, the altitude being a dynamically measured value indicative of a distance of the aircraft above sea level;
instructions executable by the processor circuitry to control a voltage magnitude on the power supply bus according to the altitude of the aircraft; and
instructions executable by the processor circuitry to decrease the voltage magnitude as the aircraft increases in altitude.

A seventeenth aspect relates to the computer readable medium of aspect sixteen, further comprising instructions executable by the processor circuitry to control the voltage magnitude on the power supply bus to maintain the first predetermined voltage until the aircraft reaches a predetermined altitude where a power demand of the electric propulsor is reduced to maintain constant thrust output of the electric propulsor.

An eighteenth aspect relates to the computer readable medium of an preceding aspect, further comprising instructions executable by the processor circuitry to control a DC/DC converter to control the voltage magnitude on the power supply bus.

A nineteenth aspect relates to the computer readable medium of an preceding aspect, further comprising instructions executable by the processor circuitry to reduce the voltage magnitude of the power supply bus in synchronism with a lapse rate of the electric propulsor, the lapse rate being a decrease in power due to lower torque demand of the electric propulsor.

A twentieth aspect relates to the computer readable medium of an preceding aspect, further comprising instructions executable by the processor circuitry to maintain the current substantially constant as the bus voltage is decreased with increasing altitude, such that performance of the propulsors remains constant.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of operating an aircraft electric propulsion system comprising:
energizing a power supply bus with a generator power source, a stored energy power source or a combination thereof;
supplying power from the power supply bus to an electric propulsor of an aircraft;
controlling, with a controller circuitry, a voltage magnitude on the power supply bus to a first predetermined voltage;
monitoring an altitude of the aircraft, the altitude being a measured dynamic value indicative of a distance of the aircraft above sea level;
monitoring, with the controller circuitry, an output thrust of the electric propulsor;
controlling, with the controller circuitry, the voltage magnitude on the power supply bus according to the altitude of the aircraft by dynamically adjusting a weighting applied to a set point of the voltage magnitude according to the output thrust of the electric propulsor; and
decreasing the voltage magnitude as the aircraft increases in altitude.

2. The method of claim 1, wherein decreasing the voltage magnitude further comprises controlling, with the controller circuitry, the decrease of the voltage magnitude to maintain a current output from the generator power source, the stored energy power source, or the combination thereof substantially constant as the altitude changes.

3. The method of claim 1, wherein decreasing the voltage magnitude further comprises adjusting, with the controller circuitry, an output voltage of the generator power source, the stored energy power source, or both, to decrease the voltage magnitude according to a lapse rate decrease in power of a power supply being supplied electric power from the power supply bus.

4. The method of claim 1, wherein decreasing the voltage magnitude further comprises estimating, by the controller circuitry, a lapse rate of the electric propulsor and decreasing the voltage magnitude according to the lapse rate of the electric propulsor, the lapse rate being a rate at which power demand by the electric propulsor decreases with increasing altitude.

5. The method of claim 1, further comprising increasing the voltage magnitude of the power supply bus, with the controller circuitry, as the altitude of the aircraft decreases to maintain substantially constant current on the power supply bus.

6. The method of claim 1, wherein the generator power source, the stored energy power source or the combination thereof comprises the stored energy power source, and wherein the stored energy power source comprises a battery pack comprising a plurality of battery cells, and wherein decreasing the voltage magnitude further comprises switching the battery cells between a parallel and a series configuration according to the altitude of the aircraft.

7. The method of claim 1, wherein the stored energy power source comprises a DC-DC converter, and wherein decreasing the voltage magnitude further comprises controlling an output voltage of the DC-DC converter according to the altitude of the aircraft.

8. A method of operating an aircraft electric propulsion system comprising:
monitoring, with a controller circuitry, a voltage and a current of a power supply bus supplying power to a load, the load comprising an electric propulsor configured to provide thrust for an aircraft;
dynamically measuring an altitude of the aircraft;
monitoring, with the controller circuitry, a thrust demand output for thrust of the electric propulsor;
dynamically adjusting, with the controller circuitry, a voltage set point of the voltage of the power supply bus according to dynamic changes in the altitude of the aircraft by dynamically adjusting a weighting applied to the voltage set point according to the thrust demand output;
maintaining, with the controller circuitry, a flow of the current on the power supply bus substantially constant as the altitude of the aircraft changes, by adjustment of the voltage set point;
decreasing, with the controller circuitry, the voltage set point of the power supply bus as the altitude of the aircraft increases; and
increasing, with the controller circuitry, the voltage set point of the power supply bus as the altitude of the aircraft decreases.

9. The method of claim 8, further comprising, switching, with the controller circuitry, according to the altitude of the aircraft, an electric power feed to electrically connect additional load to the power supply bus to increase a total load on the power supply bus with increasing altitude; and switching, with the controller circuitry, according to the altitude of the aircraft, the electric power feed to electrically disconnect the additional load from the power supply bus to decrease a total load on the power supply bus with decreasing altitude.

10. The method of claim 9, further comprising maintaining, with the controller circuitry, the current of the power supply bus substantially constant by the switching.

11. The method of claim 8, further comprising calculating, with the controller circuitry, a lapse rate of the electric propulsor, and wherein decreasing, with the controller circuitry, the voltage set point of the power supply bus as the altitude of the aircraft increases according comprises decreasing the voltage set point according to the lapse rate of the electric propulsor.

12. The method of claim 8, wherein the load further comprises additional power load of the aircraft supplied by the power supply bus, and wherein maintaining, with the controller circuitry, the flow of the current on the power supply bus substantially constant as the altitude of the aircraft changes further comprises calculating, with the controller circuitry, a lapse rate of the electric propulsor and a lapse rate of the additional power load, and wherein decreasing, with the controller circuitry, the voltage set point of the power supply bus as the altitude of the aircraft increases comprises decreasing the voltage set point according to the lapse rate of the electric propulsor and the additional power load.

13. The method of claim 8, further comprising maintaining the voltage set point of the voltage of the power supply bus at a maximum voltage while the aircraft is at or below a predetermined altitude, and adjusting, with the controller circuitry, a voltage set point of the voltage of the power supply bus according to changes in the dynamically changing altitude of the aircraft only when the aircraft is above the predetermined altitude.

14. A non-transitory computer readable medium storing instructions executable by a processor circuitry, the computer readable medium comprising:
instructions executable by the processor circuitry to control energization of a power supply bus with a generator power source, a stored energy power source or a combination thereof;
instructions executable by the processor circuitry to control a voltage magnitude on the power supply bus to a first predetermined voltage, the power supply bus supplying power from the power supply bus to an electric propulsor of an aircraft;
instructions executable by the processor circuitry to monitor an altitude of the aircraft, the altitude being a dynamically measured value indicative of a distance of the aircraft above sea level;
instructions executable by the processor circuitry to monitor an output thrust of the electric propulsor;
instructions executable by the processor circuitry to control the voltage magnitude on the power supply bus according to the altitude of the aircraft by dynamic adjustment of a weighting applied to a set point of the voltage magnitude according to the output thrust of the electric propulsor; and
instructions executable by the processor circuitry to decrease the voltage magnitude as the aircraft increases in altitude.

15. The computer readable medium of claim 14, further comprising instructions executable by the processor circuitry to control the voltage magnitude on the power supply bus to maintain the first predetermined voltage until the aircraft reaches a predetermined altitude where a power demand of the electric propulsor is reduced to maintain constant thrust output of the electric propulsor.

16. The computer readable medium of claim 14, further comprising instructions executable by the processor circuitry to control a DC/DC converter to control the voltage magnitude on the power supply bus.

17. The computer readable medium of claim 14, further comprising instructions executable by the processor circuitry to reduce the voltage magnitude of the power supply bus in synchronism with a lapse rate of the electric propulsor, the lapse rate being a decrease in power due to lower torque demand of the electric propulsor.

18. The computer readable medium of claim 14, further comprising instructions executable by the processor circuitry to maintain the current substantially constant as the bus voltage is decreased with increasing altitude, such that performance of the propulsors remains constant.

* * * * *